US007792107B2

United States Patent

(12) United States Patent
Kusano et al.

(10) Patent No.: US 7,792,107 B2
(45) Date of Patent: Sep. 7, 2010

(54) CENTER-SIDE TERMINAL OF OPTICAL NETWORK CAPABLE OF CARRYING OUT PROCESSING DEPENDING ON SUBSCRIBER NUMBER

(75) Inventors: Toshihiko Kusano, Tokyo (JP); Sou Satou, Tokyo (JP)

(73) Assignee: NEC Corporation, Tokyo (JP)

(*) Notice: Subject to any disclaimer, the term of this patent is extended or adjusted under 35 U.S.C. 154(b) by 1239 days.

(21) Appl. No.: 11/266,340

(22) Filed: Nov. 4, 2005

(65) Prior Publication Data

US 2006/0098631 A1 May 11, 2006

(30) Foreign Application Priority Data

Nov. 5, 2004 (JP) ............................. 2004-322654

(51) Int. Cl.
*H04L 12/28* (2006.01)
*H04L 12/56* (2006.01)
*H04J 3/16* (2006.01)
*H04J 14/00* (2006.01)
*H04B 10/20* (2006.01)

(52) U.S. Cl. .................. 370/390; 370/395.31; 370/399; 370/420; 370/465; 398/43; 398/58

(58) Field of Classification Search ................. 370/390, 370/395.31, 399, 420, 465; 398/43, 58
See application file for complete search history.

(56) References Cited

U.S. PATENT DOCUMENTS 7,562,129 B1 * 7/2009 Lee et al. .................... 709/223
2004/0120326 A1 * 6/2004 Yoon et al. ............. 370/395.53
2005/0047783 A1 * 3/2005 Sisto et al. .................... 398/71
2005/0100036 A1 * 5/2005 Davis ......................... 370/432
2005/0129030 A1 * 6/2005 Choi et al. ............. 370/395.53
2005/0220129 A1 * 10/2005 Boyd ......................... 370/428
2005/0243837 A1 * 11/2005 Boyd et al. ............ 370/395.52
2005/0286500 A1 * 12/2005 Minami ...................... 370/352

FOREIGN PATENT DOCUMENTS

JP 11-285035 10/1999
JP 2003-333061 A 11/2003
JP 2004-032780 A 1/2004
JP 2004-153836 5/2004
JP 2007-506300 T 3/2007
WO WO-2005/034568 A1 4/2005
WO WO-2005/104738 A2 11/2005
WO WO-2005/119945 12/2005
WO 2008-507159 T 3/2008

* cited by examiner

*Primary Examiner*—Alpus H Hsu
*Assistant Examiner*—Jeremy Costin
(74) *Attorney, Agent, or Firm*—Dickstein Shapiro LLP

(57) ABSTRACT

In a center-side terminal of an optical network, said center-side terminal connectable to a plurality of subscriber-side terminals via a passive optical splitter, a subscriber processing storing section is adapted to store a relationship between subscriber numbers regarding the subscriber-side terminals and processing contents allocated thereto, and a processing section is adapted to perform a processing upon a packet received from the subscriber-side terminals or to be transmitted thereto. The processing is determined in accordance with the relationship stored in the subscriber processing storing section using one of the subscriber numbers regarding the packet.

7 Claims, 16 Drawing Sheets

101
INTERNET
102
ROUTER
103
SUBSCRIBER LINE TERMINAL
$104_1$
$104_2$
$104_n$
$105_1$
$105_2$
$105_n$
SUBSCRIBER NETWORK UNIT
SUBSCRIBER NETWORK UNIT
SUBSCRIBER NETWORK UNIT
$106_1$
$106_2$
$106_n$

ROUTER 2
2a
3
OLT
31
I/O PROC. SEC.
32
SUBSCRIBER PROCESSING DATABASE FILE
33
FIXED LLID ADDING/ REMOVING SEC.
34
FIXED LLID DATABASE FILE
35
I/O PROC. SEC.
36
CONTROL CIRCUIT
ONU MAC
PROCESSING
FIXD LLID
$4_1$
$4_n$
$5_1$
$7_{11}$
$7_{1m}$
$10_1$
$8_{11}$
ONU
81
MPCP SEC.
82
ONU MAC ADDRESS SEC.
83
I/O PROC. SEC.

3A
36
CONTROL CIRCUIT
35
MCP SEC.
OLT
33A
FLOATING LLID ADDING/ REMOVING SEC.
34A
FLOATING LLID DATABASE FILE
31A
I/O PROC. SEC.
32A
SUBSCRIBER PROCESSING DATABASE FILE
ROUTER 2
2a
$4_1$
$4_n$
$5_1$
$7_{11}$
$7_{1m}$
$10_1$
$8_{11}$
81
MPCP SEC.
82
ONU MAC ADDRESS SEC.
83
I/O PROC. SEC.
ONU
SUBSCRIBER No.
FLOATING LLID
ONU MAC
SUBSCRIBER No.
PROCESSING

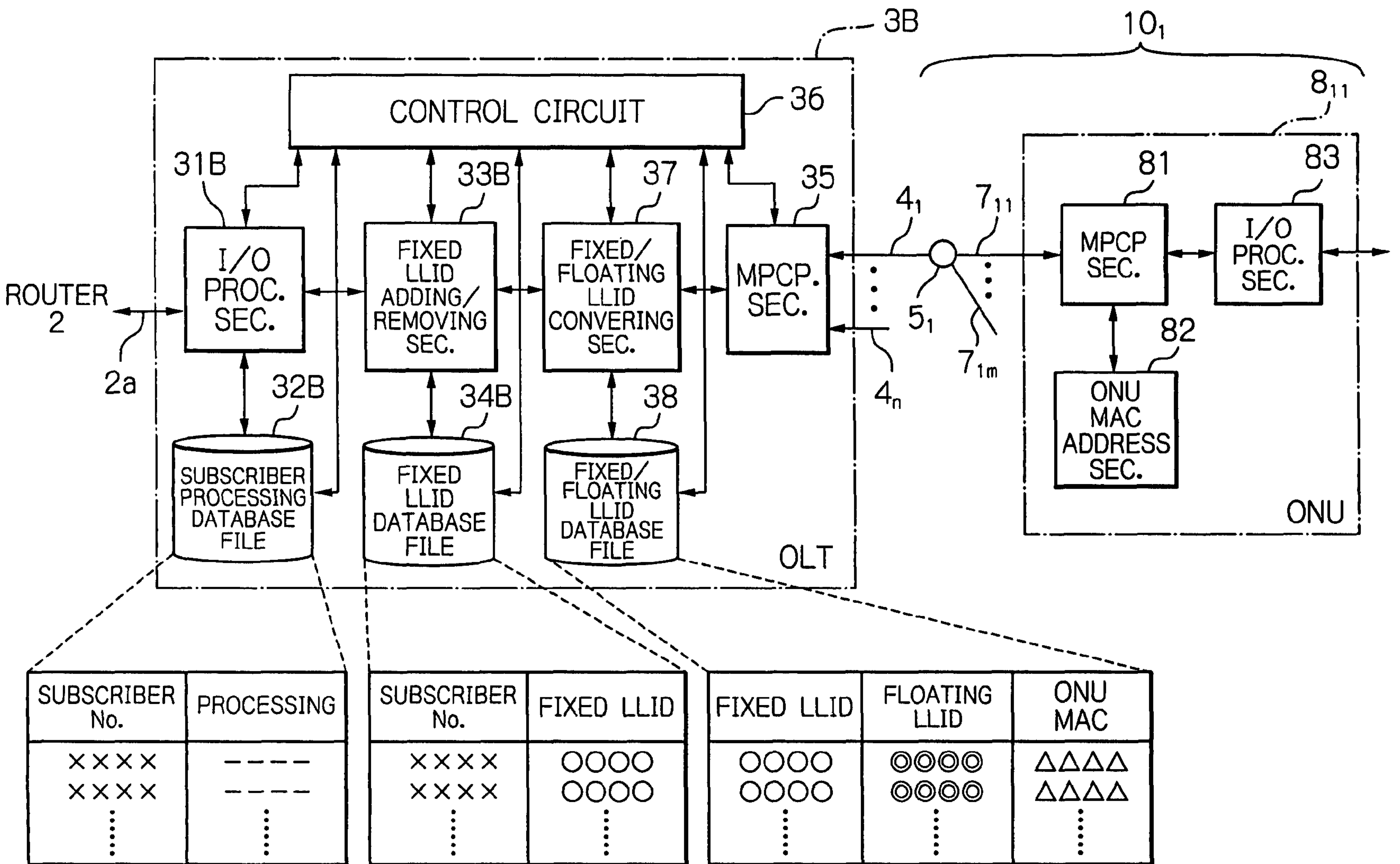
Fig. 9
3B
CONTROL CIRCUIT
36
31B
I/O PROC. SEC.
33B
FIXED LLID ADDING/ REMOVING SEC.
37
FIXED/ FLOATING LLID CONVERING SEC.
35
MPCP. SEC.
ROUTER 2
2a
32B
SUBSCRIBER PROCESSING DATABASE FILE
34B
FIXED LLID DATABASE FILE
38
FIXED/ FLOATING LLID DATABASE FILE
OLT
$10_1$
$8_{11}$
81
MPCP SEC.
83
I/O PROC. SEC.
82
ONU MAC ADDRESS SEC.
ONU
$4_1$
$7_{11}$
$5_1$
$7_{1m}$
$4_n$
SUBSCRIBER No.
PROCESSING
××××
××××
----
----
SUBSCRIBER No.
FIXED LLID
××××
××××
○○○○
○○○○
FIXED LLID
FLOATING LLID
ONU MAC
○○○○
○○○○
◎◎◎◎
◎◎◎◎
△△△△
△△△△

PACKET RECEIVING ROUTINE
(ONU → OLT)
1201
EXTRACT FLOATING LLID
1202
IS FLOATING LLID ALREADY REGISTERED ?
NO
YES
1203
CONVERT FLOATING LLID INTO FIXED LLID
1204
READ SUBSCRIBER NO.
1205
REMOVE FIXED LLID
1206
IS SUBSCRIBER NO. ALREADY REGISTERED ?
NO
YES
1207
CARRY OUT PROCESSING
1208
OUTPUT MPCP PACKET
END
1209

*Fig. 14*

| SUBSCRIBER NUMBER | PROCESSING | MULTI-CAST GROUP IDENTIFIER |
|---|---|---|
| ××× | --- | 002 |
| ××× | --- | 002 |
| ××× | --- | 005 |
| ⋮ | ⋮ | ⋮ |

32A(32B)

CENTER-SIDE TERMINAL OF OPTICAL NETWORK CAPABLE OF CARRYING OUT PROCESSING DEPENDING ON SUBSCRIBER NUMBER

BACKGROUND OF THE INVENTION

1. Field of the Invention

The present invention relates to a center-side terminal of an optical network called an optical network unit (ONU) of an Ethernet (registered trademark) passive optical network (EPON).

2. Description of the Related Art

In a first prior art network system using a x digital subscriber line (xDSL) such as an asynchronous digital subscriber line (ADSL) (see: JP-11-285035-A), use is conventionally made of metal lines of a public switched telephone network (PSTN) to realize a high speed Internet connection environment, where modulation is carried out through a high frequency band which is not used for speech signals of the PSTN.

In the above-described first prior art network system, the Internet is connected via a router to a subscriber line terminal serving as a center-side terminal which is also connected via metal lines to subscriber network units, respectively, serving as subscriber-side terminals where communication terminals such as personal computers are provided. This will be explained later in detail.

In the above-described first prior art network system, however, if the metal lines are too long, the transmission loss is large, so that there is a limit in communication speed. Also, if a subscriber-side terminal is newly provided, a new metal line has to be provided and connected between the center-side terminal and this new subscriber-side terminal, which would increase the manufacturing cost of the first prior art network system. Also, if a multi-cast communication is carried out to effectively distribute video information, information to be multi-casted is copied in the center-side terminal to cope with the subscriber-side terminals, which would complicate the control of the center-side terminal.

In a second prior art network system using EPONs (see: JP-2004-153836-A), a packet communication network carrying Ethernet (registered trademark) frames or packets is connected via a router to an optical line terminal (OLT) serving as a center-side terminal which is also connected via optical fibers to optical splitters. Each of the optical splitters is connected via optical fibers to optical network units (ONUs) serving as subscriber-side terminals where communication terminals such as personal computers are provided. This will be explained later in detail.

In the above-described second prior art network system, since the system is optical, there is no limit in communication speed as compared with the above-described first prior art network system. Also, if the single optical fiber is already provided from the OLT to the optical splitter, when an ONU is newly provided, the new ONU has only to be connected to its nearest optical splitter, which would not increase the manufacturing cost of the second prior art network system.

In the above-described second prior art network system, however, since subscriber information regarding an ONU is fixed to the media access control (MAC) address of the communication terminal provided in the corresponding ONU, the control of the OLT would be complicated.

SUMMARY OF THE INVENTION

It is an object of the present invention to provide a center-side terminal of an optical network with simple controllability.

According to the present invention, in a center-side terminal of an optical network, the center-side terminal connectable to a plurality of subscriber-side terminals via a passive optical splitter, a subscriber processing storing section is adapted to store a relationship between subscriber numbers regarding the subscriber-side terminals and processing contents allocated thereto, and a processing section is adapted to perform a processing upon a packet received from the subscriber-side terminals or to be transmitted thereto. The processing is determined in accordance with the relationship stored in the subscriber processing storing section using one of the subscriber numbers regarding the packet. Since the subscriber numbers are allocated to the subscriber-side terminals, not to the communication terminals thereof, even if the MAC addresses of the communication terminals are changed, the control of the center-side terminal is not changed.

BRIEF DESCRIPTION OF THE DRAWINGS

The present invention will be more clearly understood from the description set forth below, as compared with the prior art, with reference to the accompanying drawings, wherein:

FIG. 9 is a block circuit diagram illustrating a second embodiment of the center-side terminal of an optical network according to the present invention;

FIG. 14 is a diagram illustrating a modification of the subscriber processing database file of FIGS. 4 and 9;

DESCRIPTION OF THE PREFERRED EMBODIMENTS

Before the description of the preferred embodiments, prior art network systems will be explained with reference to FIGS. 1, 2 and 3.

Figure 1:
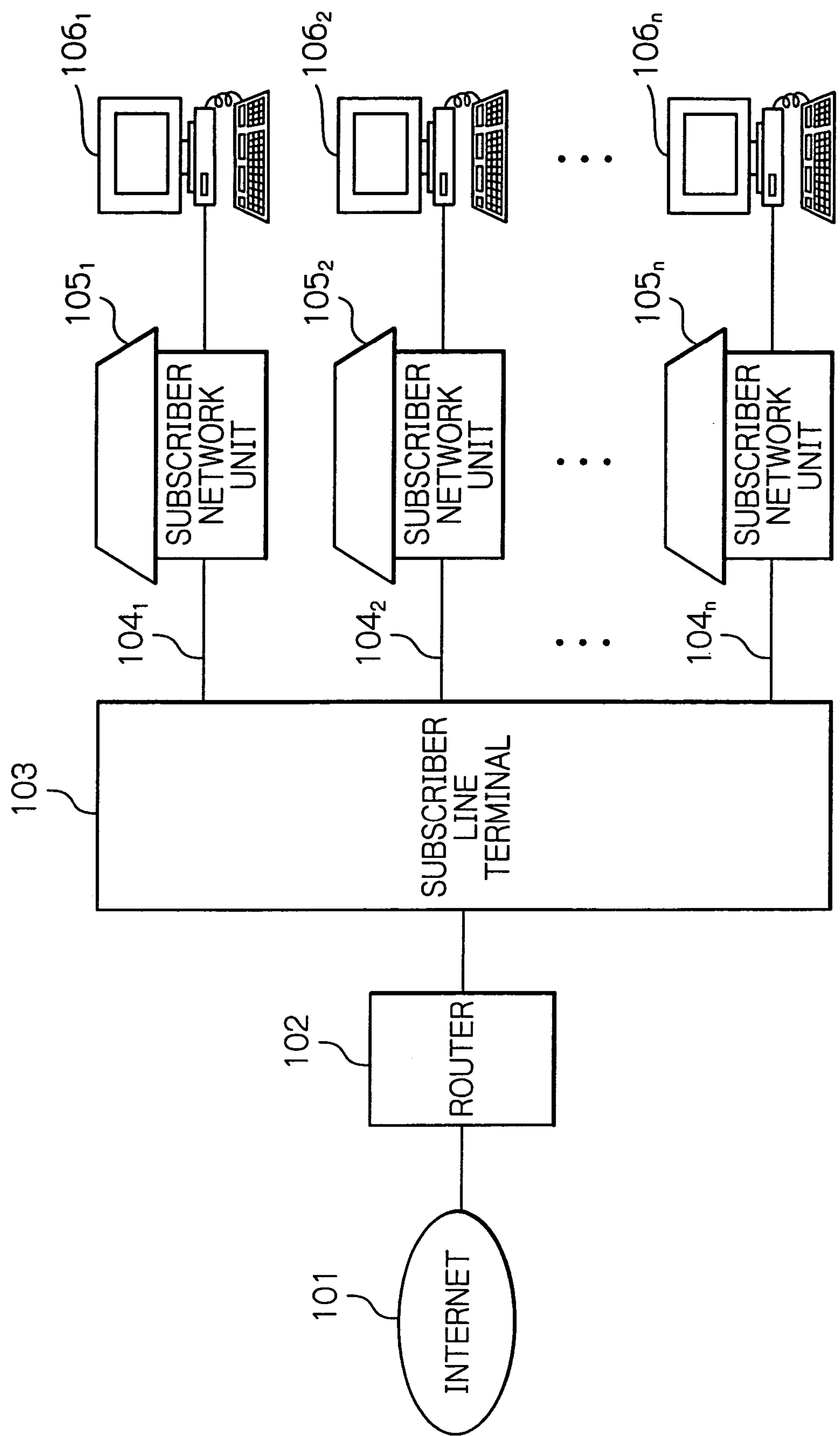
FIG. 1 is a circuit diagram illustrating a first prior art network system.

In FIG. 1, which illustrates a first prior art network system using an ADSL (see: JP-11-285035-A), the Internet 101 is connected via a router 102 to a subscriber line terminal 103 serving as a center-side terminal which is also connected via metal lines $\mathbf{104}_1$, $\mathbf{104}_2$, . . . , $\mathbf{104}_n$ to subscriber network units $\mathbf{105}_1$, $\mathbf{105}_2$, . . . , $\mathbf{105}_n$, respectively, serving as subscriber-side terminals where communication terminals $\mathbf{106}_1$, $\mathbf{106}_2$, . . . , $\mathbf{106}_n$ such as personal computers are provided.

In the network system of FIG. 1, since a point-to-point connection using the metal lines 104$_1$, 104$_2$, . . . , 104$_n$ is carried out between the center-side terminal, i.e., the subscriber line terminal 103 and the subscriber-side terminals, i.e., the subscriber network units 105$_1$, 105$_2$, . . . , 105$_n$, a logical link between the subscriber line terminal 103 and the subscriber network units 105$_1$, 105$_2$, . . . , 105$_n$ is fixed by subscriber information regarding the subscriber network units 105$_1$, 105$_2$, . . . , 105$_n$. Therefore, in the subscriber line terminal 103, a processing such as a filtering processing is carried out by the fixed logical link. Also, even when some of the communication terminals 106$_1$, 106$_2$, . . . , 106$_n$ are replaced by others so that the media access control (MAC) addresses thereof are changed, the subscriber information is not changed, so that no change of control is required in the subscriber line terminal 103.

In the network system of FIG. 1, however, if the metal lines 104$_1$, 104$_2$, . . . , 104$_n$ are too long, the transmission loss is large, so that there is a limit in communication speed. Also, if a subscriber network unit is newly provided, a new metal line has to be provided and connected between the subscriber line terminal 103 and this new subscriber network unit, which would increase the manufacturing cost of the network system of FIG. 1. In this case, note that, if use is made of an existing metal line of a public switched telephone network (PSTN) as such a new metal line, no additional metal line is required, which would not increase the manufacturing cost of the network system of FIG. 1. Also, if a multi-cast communication is carried out to effectively distribute video information, information to be multi-casted is copied in the subscriber line terminal 103 to cope with the subscriber network units 105$_1$, 105$_2$, . . . , 105$_n$, which would complicate the control of the subscriber line terminal 103.

Figure 2:
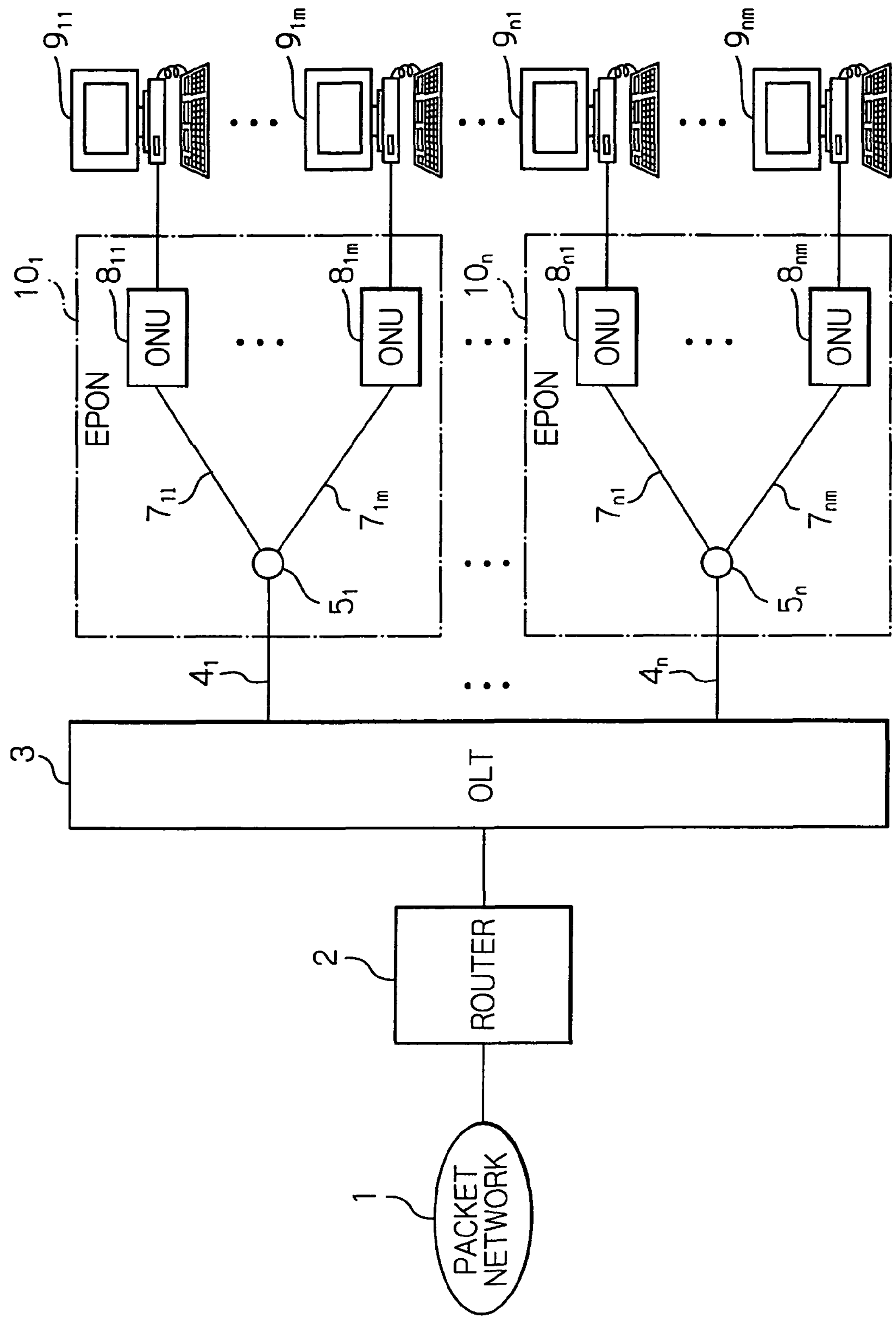
FIG. 2 is a block circuit diagram illustrating a second prior art network system.

In FIG. 2, which illustrates a second prior art network system using EPONs (see: JP-2004-153836-A), a packet communication network 1 carrying Ethernet (registered trademark) frames or packets is connected via a router 2 to an optical line terminal (OLT) 3 serving as a center-side terminal which is also connected via optical fibers 4$_1$, . . . , 4$_n$ to optical splitters 5$_1$, . . . , 5$_n$. Each of the optical splitters 5$_1$, . . . , 5$_n$ is connected via optical fibers 7$_{11}$, . . . , 7$_{1m}$; . . . ; 7$_{n1}$, . . . , 7$_{nm}$ to optical network units (ONUs) 8$_{11}$, . . . , 8$_{1m}$; . . . ; 8$_{n1}$, . . . , 8$_{nm}$ serving as subscriber-side terminals where communication terminals 9$_{11}$, . . . , 9$_{1m}$; . . . ; 9$_{n1}$, . . . , 9$_{nm}$ such as personal computers are provided.

Each of the optical splitters 5$_1$, . . . , 5$_n$ is a passive element which splits a packet from the OLT 3 to the ONUs such as 8$_{11}$, . . . , 8$_{1m}$, and combines packets from the ONUs such as 8$_{11}$, . . . , 8$_{1m}$ into the OLT 3.

The optical splitter 5$_1$ and the ONUs 8$_{11}$, . . . , 8$_{1m}$ form an EPON 10$_1$. Similarly, the optical splitter 5$_n$ and the ONUs 8$_{n1}$, . . . , 8$_{nm}$ form an EPON 10$_n$.

In the EPONs 10$_1$, . . . , 10$_n$, a two-byte logic link identifier (LLID) incorporated into a preamble of a MAC frame (packet) is used to realize a point-to-multi points Ethernet (registered trademark) connection. That is, when one MAC frame reaches one of the ONUs from its corresponding optical splitter, this ONU reads the LLID of the MAC frame to determine whether or not the MAC frame belongs to this ONU. Only when the MAC frame belongs to this ONU, is this MAC frame fetched. Otherwise, the MAC frame will be scrapped. This is called a filtering processing.

In the network system of FIG. 2, since the system is optical, there is no substantial limit in communication speed. Also, if the single optical fiber 4$_1$, . . . , or 4$_n$ is already provided from the OLT 3 to the optical splitter 5$_1$, . . . , or 5$_n$, when an ONU is newly provided, the new ONU has only to be connected to its nearest optical splitter, which would not increase the manufacturing cost of the network system of FIG. 2. Also, if a multi-cast communication is carried out to effectively distribute video information, copying of information to be multi-casted is unnecessary, which would simplify the control of the OLT 3.

Figure 3:
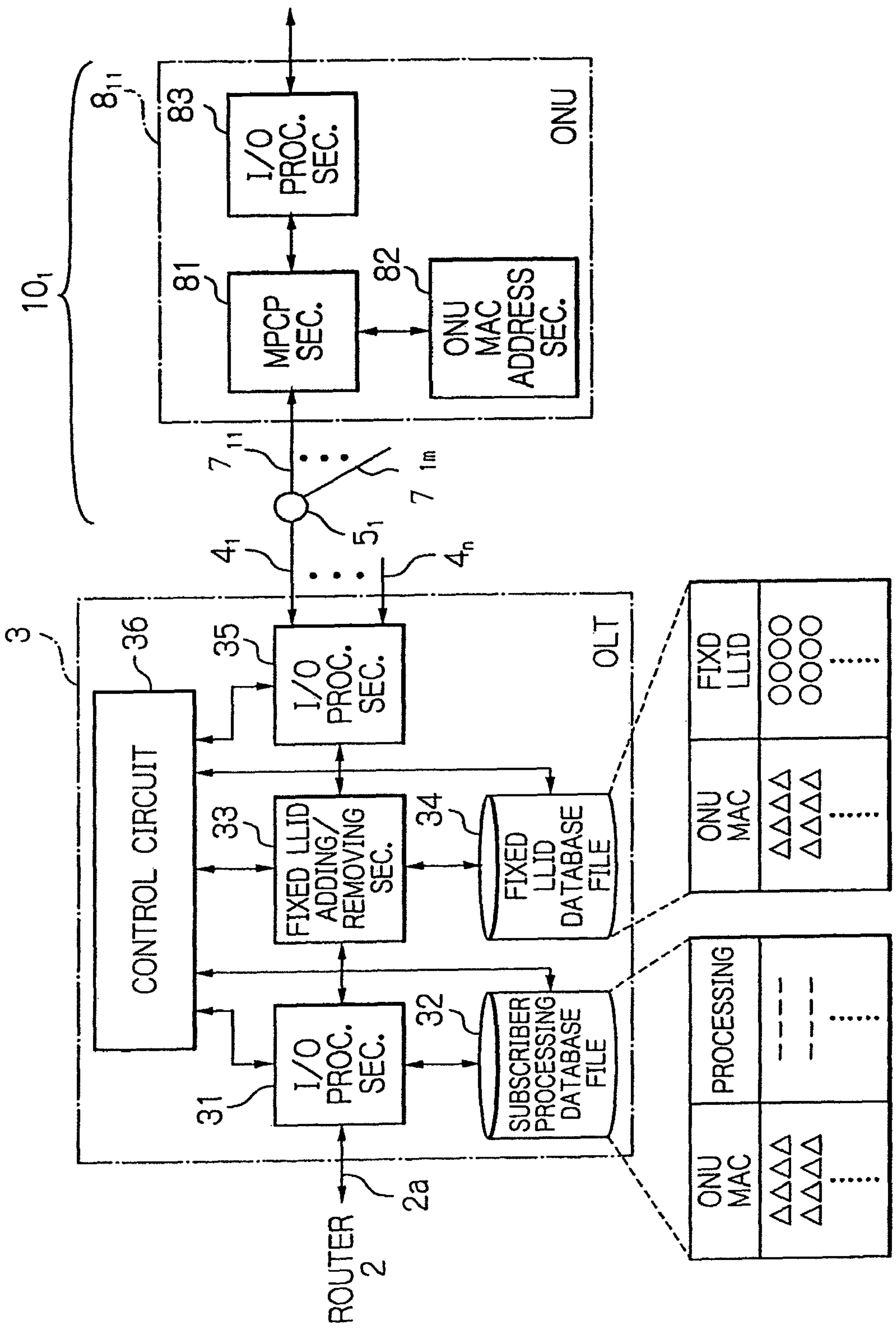
FIG. 3 is a detailed block circuit diagram of the OLT and the ONU of FIG. 2.

In FIG. 3, which is a detailed block circuit diagram of the OLT 3 and the EPON 10$_1$ of FIG. 2, the OLT 3 is constructed by an input/output processing section 31 connected via a Giga bit Ethernet (registered trademark) (GbE) optical fiber 2*a* to the router 2, a subscriber processing database file 32 for storing a relationship between the MAC addresses of the communication terminals provided in the ONUs and their processing contents, a fixed logical link identifier adding/removing section 33, a fixed logical link identifier database file 34 for storing a relationship between the MAC addresses of the communication terminals provided in the ONUs and their fixed logical link identifiers, and a multi-point control protocol (MPCP) section 35 operable based on the Institute of Electrical and Electronics Engineers, Inc. (IEEE) 802.3 protocol. The input/output processing section 31, the subscriber process database file 32, the fixed logical link identifier adding/removing section 33, the fixed logical identifier database file 34 and the MPCP section 35 are controlled by a control circuit 36 which may include a central processing unit (CPU) and a memory.

In the OLT 3 of FIG. 3, however, since subscriber information regarding an ONU is fixed to the MAC address of the communication terminal provided in the corresponding ONU, the control of the OLT 3 would be complicated. That is, since the subscriber processing database file 32 and the fixed logic link identifier database file 34 are formed on the basis of the MAC addresses, the reception of a fixed LLID determines a processing to be carried out through its corresponding MAC address. Therefore, when some of the communication terminals 9$_{11}$, . . . , 9$_{1m}$; . . . ; 9$_{n1}$, . . . , 9$_{nm}$ are replaced by others, the MAC addresses thereof are changed, so that a change of the subscriber processing database file 32 and the fixed logic link identifier database file 34 is required in the OLT 3, which would complicate the control of the OLT 3.

Figure 4:
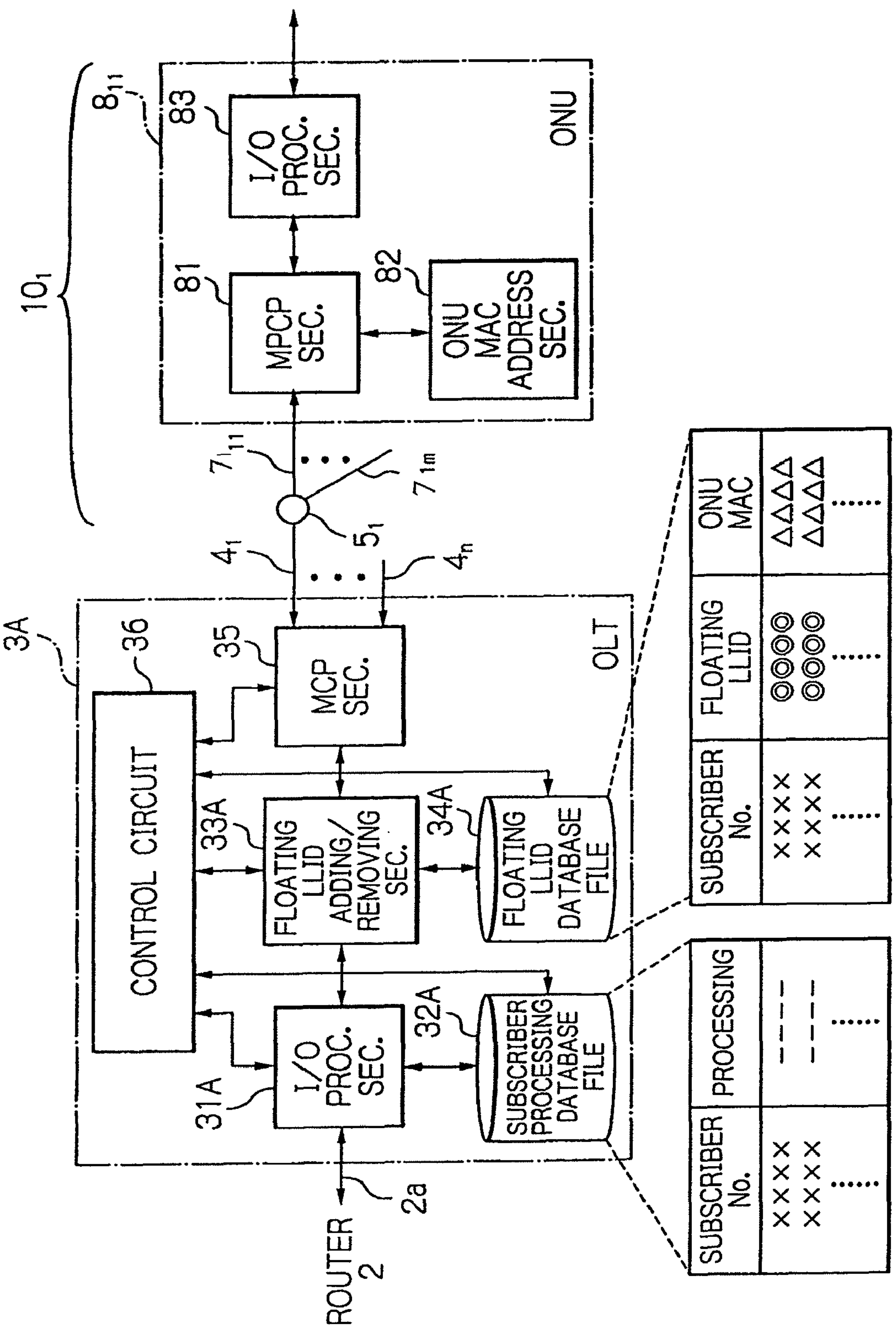
FIG. 4 is a block circuit diagram illustrating a first embodiment of the center-side terminal of an optical network according to the present invention.

In FIG. 4, which illustrates a first embodiment of the center-side terminal according to the present invention, the OLT 3 of FIG. 3 serving as the center-side terminal is replaced by an OLT 3A where the input/output processing section 31 is modified to an input/output processing section 31A, the subscriber processing database file 32 is modified to a subscriber processing database file 32A, the fixed logical link identifier adding/removing section 33 is modified to a floating logical link identifier adding/removing section 33A, and the fixed logical link identifier database file 34 is modified to a floating logical link identifier database file 34A.

The subscriber processing database file 32A stores a relationship between subscriber numbers such as a telephone number, a subscriber name an E-mail address or the like and their processing contents. Also, the floating logical link database file 34A stores a relationship between subscriber numbers, floating logical link identifiers and MAC addresses.

In FIG. 4, since subscriber information regarding an ONU is floating with respect to the MAC address of the communication terminal provided in the corresponding ONU, the control of the OLT 3 would not be complicated. That is, since the subscriber processing database file 32A and the floating logical link identifier database file 34A are formed on the basis of the subscriber numbers, the reception of a floating LLID determines a processing to be carried out through its corresponding subscriber number. Therefore, even when some of the communication terminals 9$_{11}$, . . . , 9$_{1m}$; . . . ; 9$_{n1}$, . . . , 9$_{nm}$ are replaced by others, the subscriber numbers are not changed, so that a change of the subscriber processing database file 32A and the floating logical link identifier database file 34A is not required in the OLT 3A, which would simplify the control of the OLT 3A.

The operation of the control circuit 36 of FIG. 4 will be explained next with reference to FIGS. 5, 6, 7 and 8.

Figure 5:
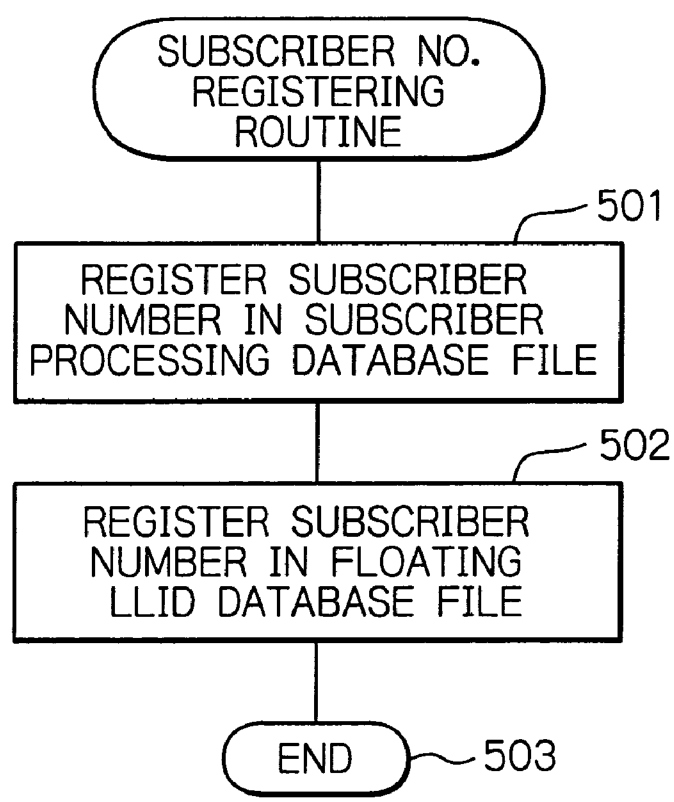
FIGS. 5, 6, 7 and 8 are flowcharts for explaining the operation of the center-side terminal of FIG. 4.

FIG. 5 is a subscriber number registering routine which is carried out every time a customer requests registering a subscriber number.

First, at step 501, a processing content is registered in the subscriber processing database file 32A by referring to the subscriber number of the customer.

Next, at step 502, a subscriber number is registered in the floating logical link identifier database file 34A by referring to the MAC address of the communication terminal of the client.

Then, the routine of FIG. 5 is completed by step 503.

Note that the subscriber processing database file 32A and the floating logical link identifier database file 34A are linked by the subscriber number information. In this case, the MAC addresses are listed in the floating logical link identifier database file 34A; however, the MAC addresses have no direct relationship to processing to be carried out.

Figure 6:
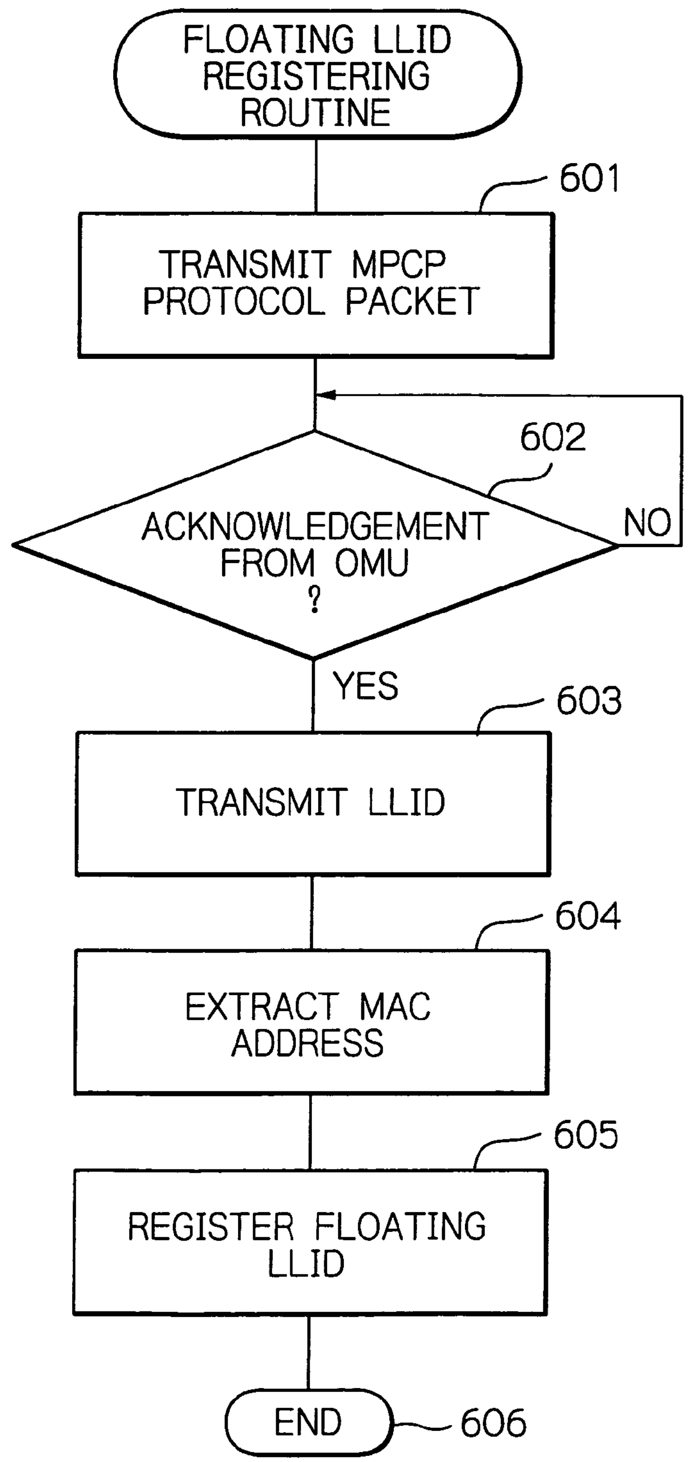

FIG. 6 is a floating logical link identifier registering routine carried out every time one of the ONUs requests registering a floating logical link.

First, at step 601, the control circuit 36 operates the MPCP section 35, so that an MPCP protocol packet is transmitted to the requesting ONU.

Next, at step 602, the MPCP section 35 waits for an acknowledgement packet from the requesting UNO. Only when such an acknowledgement packet has been received by the MPCP section 35, does the control proceed to step 603.

Next, at step 603, the MPCP section 35 extracts one logical link identifier from an unused floating logical link identifier list that stores logical link identifiers unused in the floating logical link identifier database file 34A, and transmits it to the requesting ONU.

Next, at step 604, the MPCP section 35 extracts a MAC address from the above-mentioned acknowledgement packet.

Next, at step 605, the control circuit 36 accesses the floating logical link identifier database file 34A so that the above-mentioned logical link identifier is stored as a floating logical link identifier in the floating logical link identifier database file 34A by referring to the MAC address.

Then, the routine of FIG. 6 is completed by step 606.

Figure 7:
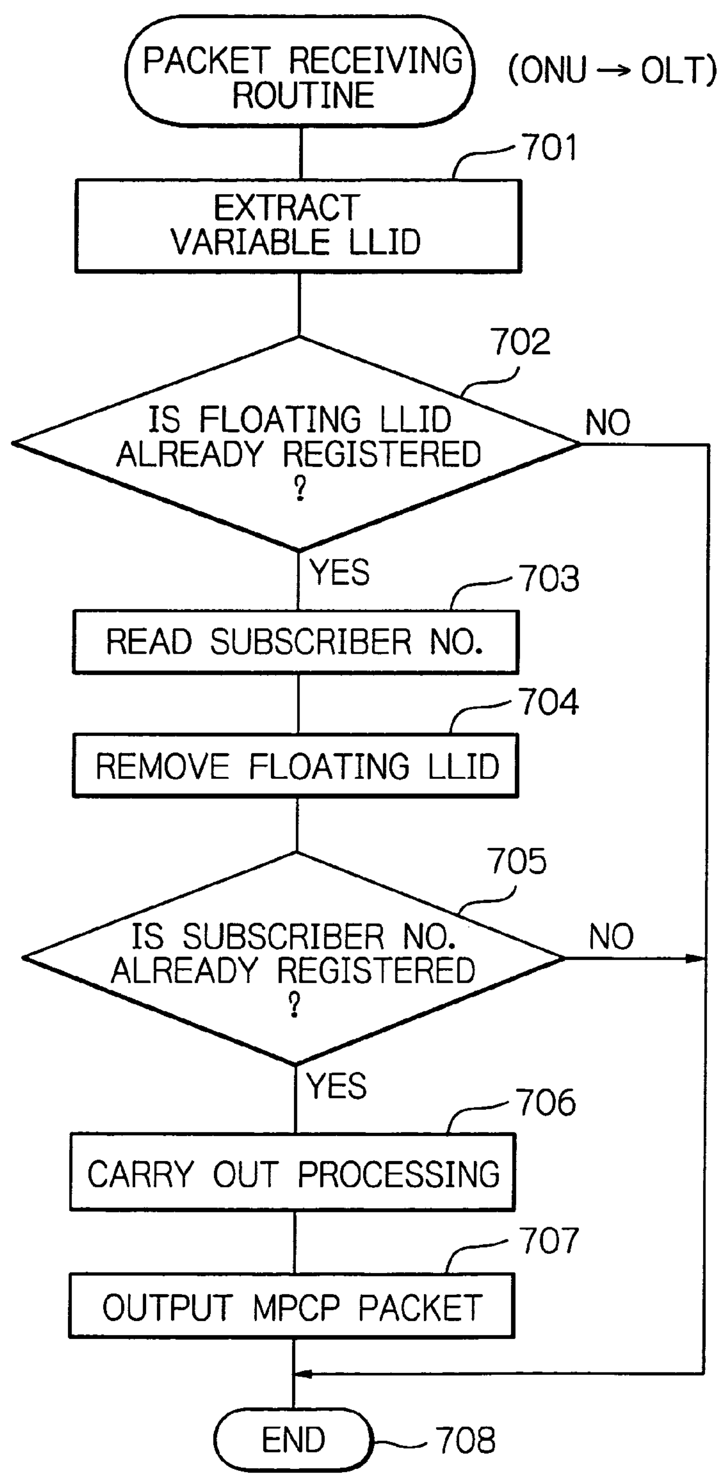

FIG. 7 is a packet receiving routine carried out every time the MPCP section 35 has received a MPCP protocol packet associated with a two-type floating logical link identifier from one of the ONUs.

First, at step 701, the MPCP section 35 extracts the floating logical link identifier from the received packet.

Next, at step 702, the control circuit 36 operates the floating logical link identifier adding/removing section 33A to determine whether or not the extracted floating logical link identifier is already registered in the floating logical link identifier database file 34A. Only when the extracted floating logical link identifier is already registered, does the control proceed to step 703. Otherwise, the control proceeds directly to step 708.

At step 703, the control circuit 36 operates the floating logical link identifier adding/removing section 33A to read the subscriber number corresponding to the extracted floating logical link identifier from the floating logical link identifier database file 34A.

Next, at step 704, the control circuit 36 operates the floating logical link identifier adding/removing section 33A to remove the floating logical link identifier from the MPCP protocol packet.

Next, at step 705, the control circuit 36 operates the input/output processing section 31A to determine whether or not the read subscriber number is already registered in the subscriber processing database file 32A. Only when the read subscriber number is already registered, does the control proceed to step 706. Otherwise, the control proceeds directly to step 708.

At step 706, the control circuit 36 operates the input/output processing section 31A to carry out a processing corresponding to the subscriber number in the subscriber processing database file 32A. For example, such a processing may scrap the MPCP protocol packet depending upon its destination.

Next, at step 707, the input/output processing section 31A transmits the MPCP protocol packet to the router 2 of FIG. 2.

Then, the routine of FIG. 7 is completed by step 708.

Figure 8:
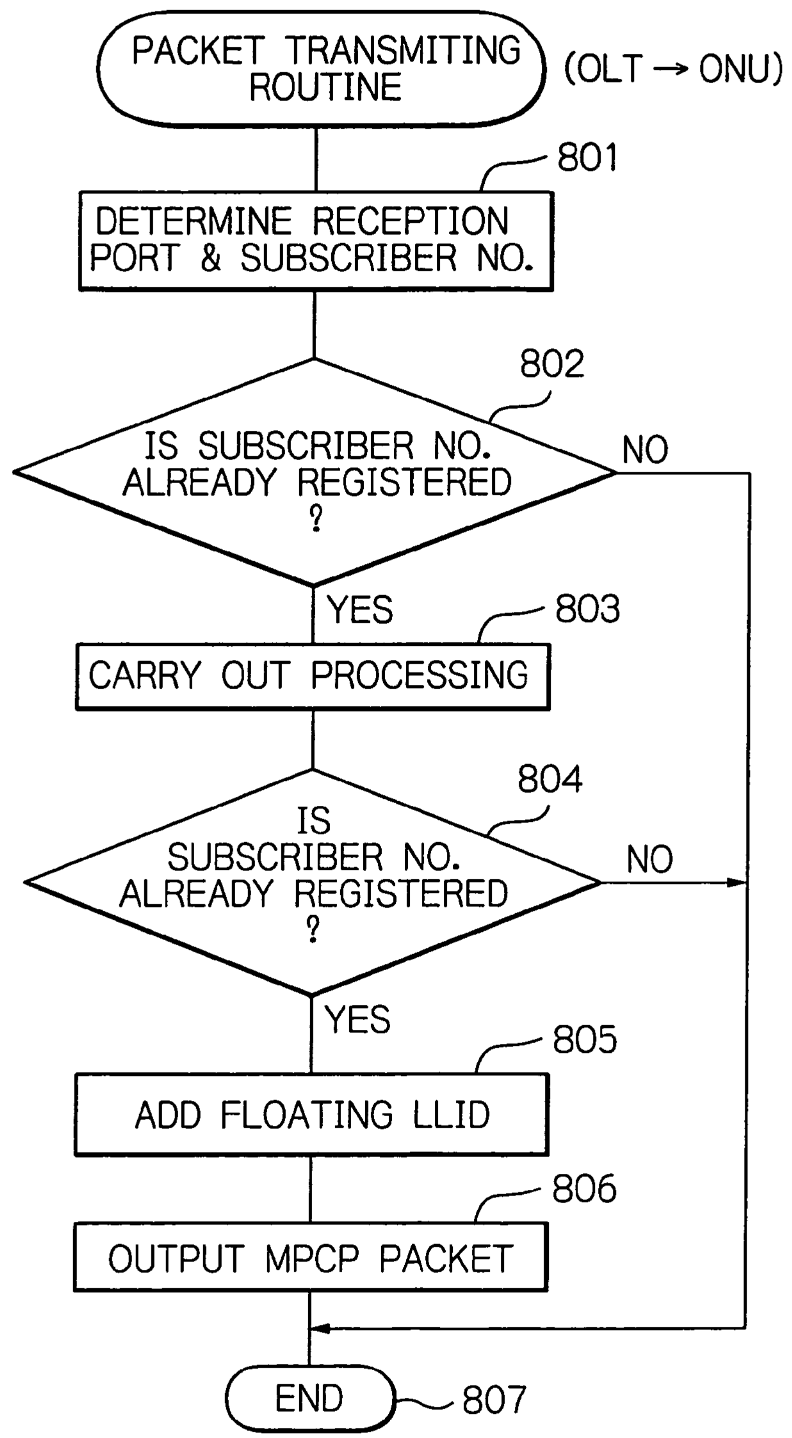

FIG. 8 is a packet transmitting routine carried out every time the input/output processing section 31A has received a packet from the router 2 of FIG. 2.

First, at step 801, the control circuit 36 determines one of the reception ports, i.e., one of the optical fibers $\mathbf{4}_1, \ldots, \mathbf{4}_n$ and a subscriber number in accordance with the destination address of the received packet.

Next, at step 802, the control circuit 36 operates the input/output processing section 31A to determine whether or not the subscriber number is already registered in the subscriber processing database file 32A. Only when the subscriber number is already registered, does the control proceed to step 803 which carries out a processing such as a filtering processing by referring to the subscriber processing database file 32A. Otherwise, the control proceeds directly to step 807.

At step 804, the control circuit 36 operates the floating logical link adding/removing section 33A to determine whether or not the subscriber number is already registered in the floating logical link identifier database file 34A. As a result, only when the subscriber number is already registered, does the control proceed to step 805. Otherwise, the control proceeds directly to step 807.

At step 805, the control circuit 36 operates the floating logical link identifier adding/removing section 33A to add the floating logical link identifier of the subscriber number to the packet by referring to the floating logical link identifier database file 34A.

Next, at step 806, the control circuit 36 operates the MPCP protocol section 35 to transmit an MPCP protocol packet including the floating logical link identifier to the determined reception port or the optical fiber $\mathbf{4}_1, \ldots,$ or $\mathbf{4}_n$.

Then, the routine of FIG. 8 is completed by step 807.

In the above-described first embodiment, an EPON communication is carried out by using floating LLIDs which have no direct relationship to MAC addresses, and also, a processing can be carried out by referring to the subscriber numbers using the floating LLID without referring to its corresponding MAC address.

In FIG. 9, which illustrates a second embodiment of the center-side terminal according to the present invention, the OLT 3 of FIG. 3 serving as the center-side terminal is replaced by an OLT 3B where the input/output processing section 31 is modified to an input/output processing section 31B, the subscriber processing database file 32 is modified to a subscriber processing database file 32B, the fixed logical link identifier adding/removing section 33 is modified to a floating logical link identifier adding/removing section 33B, and the fixed logical link identifier database file 34 is modified to a floating logical link identifier database file 34B.

The subscriber processing database file 32B stores a relationship between subscriber numbers such as a telephone number, a subscriber name an E-mail address or the like and their processing contents, as in the subscriber processing database file 32A of FIG. 4. Also, the fixed logical link identifier database file 34B stores a relationship between the subscriber numbers and their fixed logical link identifiers.

Also, in the OLT 3B of FIG. 9, a fixed/floating logical link identifier converting section 37 and a fixed/floating logical link identifier database file 38 are added to the elements of FIG. 3. The fixed/floating logical link identifier database file 38 stores a relationship between fixed logical link identifiers, floating logical link identifiers and MAC addresses.

Even in FIG. 9, since subscriber information regarding an ONU is floating with respect to the MAC address of the communication terminal provided in the corresponding ONU, the control of the OLT 3B would not be complicated. That is, since the subscriber processing database file 32B and the fixed logical link identifier database file 34B are formed on the basis of the subscriber numbers, and also the fixed logical link identifier database file 34B and the fixed/floating logical link identifier database file 38 are formed on the basis of the fixed logical link identifiers, the reception of a floating LLID determines a processing to be carried out through its corresponding fixed LLID and subscriber number. Therefore, even when some of the communication terminals $\mathbf{9}_{11}, \ldots, \mathbf{9}_{1m}; \ldots; \mathbf{9}_{n1}, \ldots, \mathbf{9}_{nm}$ are replaced by others, the fixed LLIDs and the subscriber numbers are not changed, so that a change of the subscriber processing database file 32B the fixed logical link identifier database file 34B and the fixed/floating logical link identifier database file 38 is not required in the OLT 3B, which would simplify the control of the OLT 3B.

The operation of the control circuit 36 of FIG. 9 will be explained next with reference to FIGS. 10, 11, 12 and 13.

Figure 10:
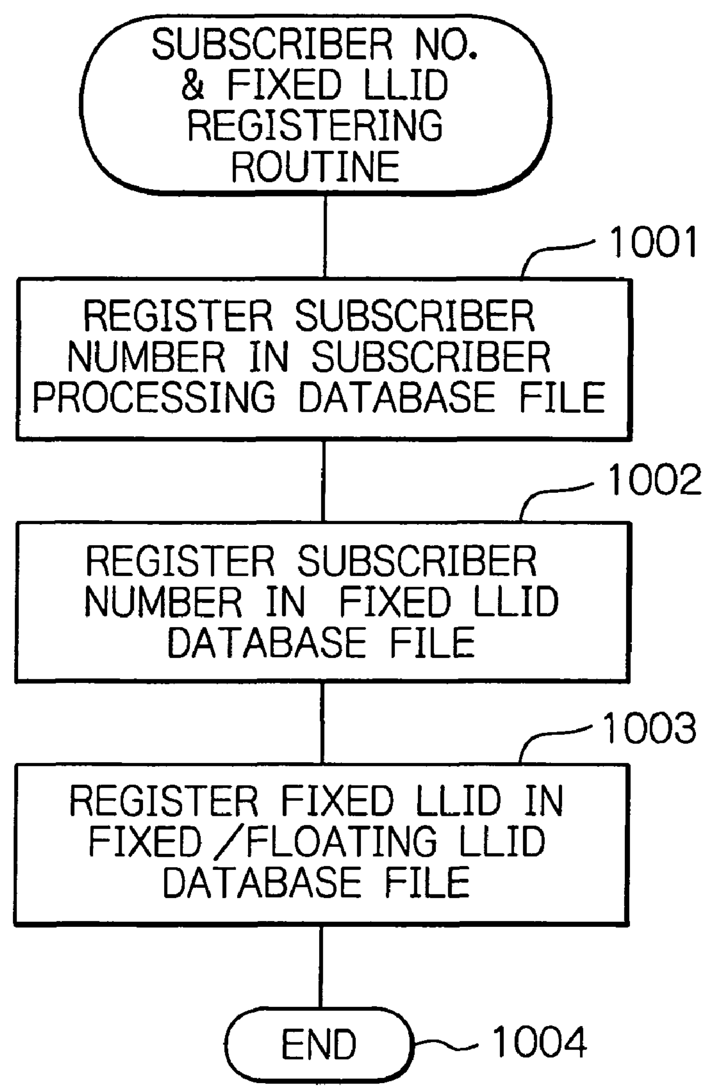
FIGS. 10, 11, 12 and 13 are flowcharts for explaining the operation of the center-side terminal of FIG. 9.

FIG. 10 is a subscriber number/fixed LLID registering routine which is carried out every time a customer requests registering a subscriber number and a fixed LLID.

First, at step 1001, a processing content is registered in the subscriber processing database file 32B by referring to the subscriber number of the customer.

Next, at step 1002, a subscriber number is registered in the fixed logical link identifier database file 34B by referring to the fixed LLIDs.

Next, at step 1003, a fixed LLIDs is registered in the fixed/floating logical link identifier database file 38 by referring to the MAC address of the communication terminal of the client.

Then, the routine of FIG. 10 is completed by step 1004.

Note that the subscriber processing database file 32B and the fixed logical link identifier database file 34B are linked by the subscriber number information. In this case, the MAC addresses are listed in the fixed/floating logical link identifier database file 38; however, the MAC addresses have no direct relationship to processing to be carried out, and the fixed logic link identifier database file 34B and the fixed/floating logical link identifier database file 38 are linked by the fixed logical link identifiers.

Figure 11:
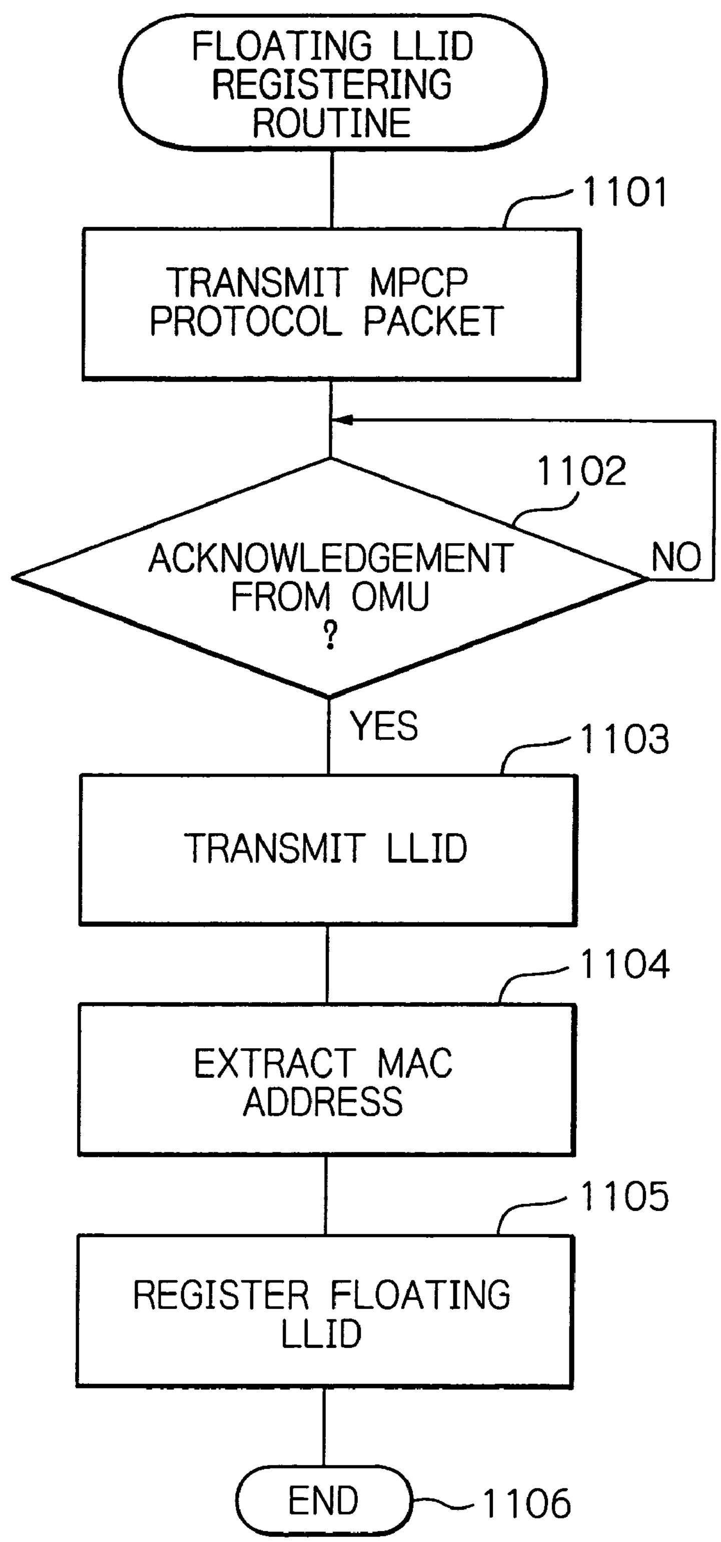

FIG. 11 is a floating logical link identifier registering routine carried out every time one of the ONUs requests registering a floating LLID.

First, at step 1101, the control circuit 36 operates the MPCP section 35, so that an MPCP protocol packet is transmitted to the requesting ONU.

Next, at step 1102, the MPCP section 35 waits for an acknowledgement packet from the requesting ONU. Only when such an acknowledgement packet has been received by the MPCP section 35, does the control proceed to step 1103.

Next, at step 1103, the MPCP section 35 extracts one logical link identifier from an unused floating logical link identifier list that stores logical link identifiers unused in the floating logical link identifier database file 34B, and transmits it to the requesting ONU.

Next, at step 1104, the MPCP section 35 extracts an MAC address from the above-mentioned acknowledgement packet.

Next, at step 1105, the control circuit 36 operates the fixed/floating logical link identifier converting section 37 to access the fixed/floating logical link identifier database file 38 so that the above-mentioned logical link identifier is stored as a floating logical link identifier in the fixed/floating logical link identifier database file 38 by referring to the MAC address.

Then, the routine of FIG. 11 is completed by step 1106.

Figure 12:
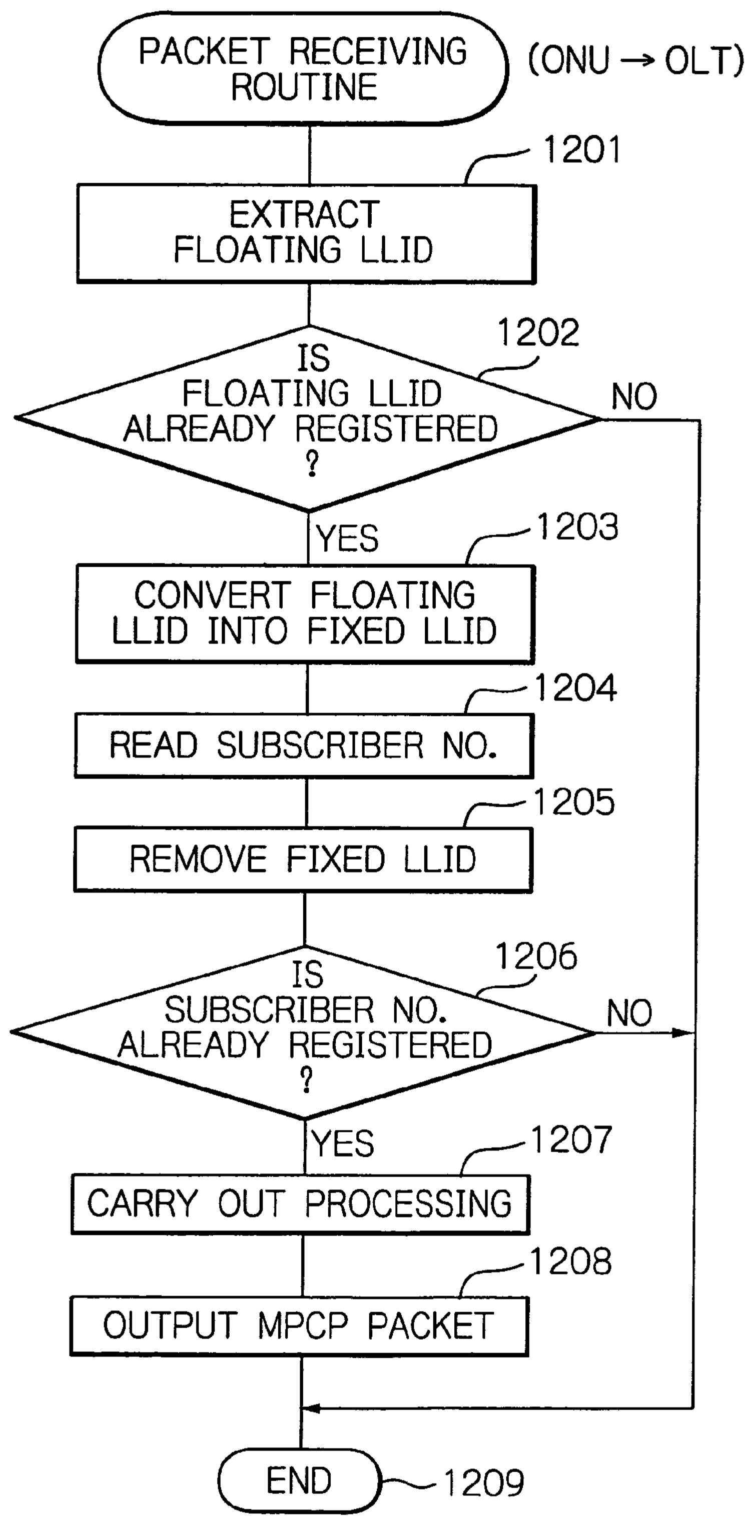

FIG. 12 is a packet receiving routine carried out every time the MPCP section 35 has received an MPCP protocol packet associated with a two-type floating logical link identifier from one of the ONUs.

First, at step 1201, the MPCP section 35 extracts the floating logical link identifier from the received packet.

Next, at step 1202, the control circuit 36 operates the fixed/floating logical link identifier converting section 37 to determine whether or not the extracted floating logical link identifier is already registered in the fixed/floating logical link identifier database file 38. Only when the extracted floating logical link identifier is being registered, does the control proceed to step 1203. Otherwise, the control proceeds directly to step 1209.

At step 1203, the control circuit 36 operates the fixed/floating logical link identifier converting section 37 to read the fixed logical link identifier corresponding to the registered floating logical link identifier LLID.

Next, at step 1204, the control circuit 36 operates the fixed logical link identifier adding/removing section 33B to read the subscriber number corresponding to the read fixed logical link identifier from the fixed logical link identifier database file 34B.

Next, at step 1205, the control circuit 36 operates the fixed logical link identifier adding/removing section 33B to remove the fixed logical link identifier from the MPCP protocol packet.

Next, at step 1206, the control circuit 36 operates the input/output processing section 31B to determine whether or not the read subscriber number is already registered in the subscriber processing database file 32B. Only when the read subscriber number is already registered, does the control proceed to step 1207. Otherwise, the control proceeds directly to step 1209.

At step 1207, the control circuit 36 operates the input/output processing section 31B to carry out a processing corresponding to the subscriber number in the subscriber processing database file 32B. For example, such a processing is to scrap the MPCP protocol packet depending upon its destination.

Next, at step 1208, the input/output processing section 31B transmits the MPCP protocol packet to the router 2 of FIG. 2.

Then, the routine of FIG. 12 is completed by step 1209.

Figure 13:
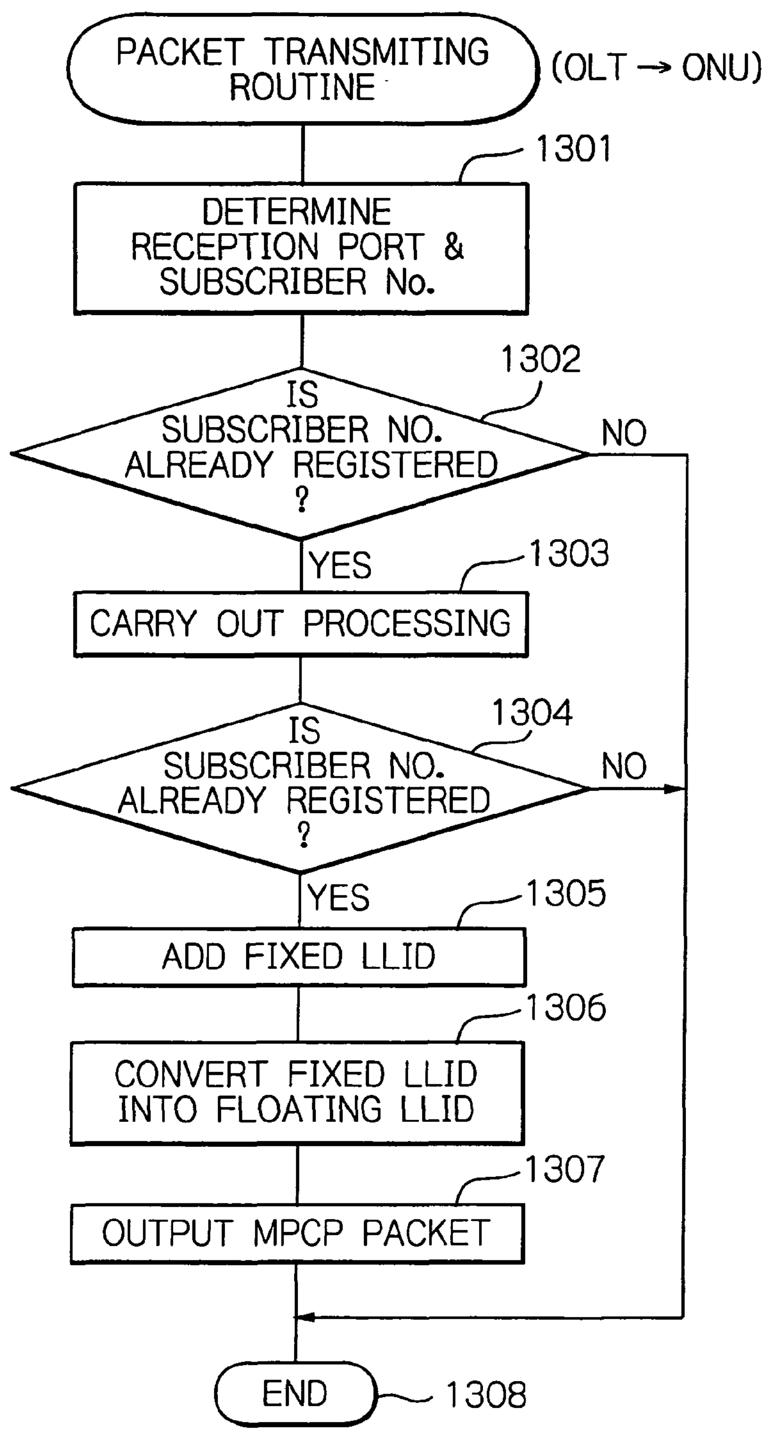

FIG. 13 is a packet transmitting routine carried out every time the input/output processing section 31B has received a packet from the router 2 of FIG. 2.

First, at step 1301, the control circuit 36 determines one of the reception ports, i.e., one of the optical fibers $\mathbf{4}_1, \ldots, \mathbf{4}_n$ and a subscriber number in accordance with the destination address of the received packet.

Next, at step 1302, the control circuit 36 operates the input/output processing section 31B to determine whether or not the subscriber number is already registered in the subscriber processing database file 32B. Only when the subscriber number is already registered, does the control proceed to step 1203 which carries out a processing such as a filtering processing by referring to the subscriber processing database file 32B. Otherwise, the control proceeds directly to step 1208.

At step 1304, the control circuit 36 operates the fixed logical link identifier adding/removing section 33B to determine whether or not the subscriber number is already registered in the fixed logical link identifier database file 34B. As a result, only when the subscriber number is already registered, does the control proceed to step 1305. Otherwise, the control proceeds directly to step 1308.

At step 1305, the control circuit 36 operates the fixed logical link identifier adding/removing section 33B to add the fixed logical link identifier of the subscriber number to the packet by referring to the fixed logical link identifier database file 34B.

Next, at 1306, the control circuit 36 operates the fixed/floating logical link identifier converting section 37 to read the floating logical link identifier corresponding to registered fixed logical link identifier LLID.

Next, at step 1307, the control circuit 36 operates the MPCP protocol section 35 to transmit an MPCP protocol packet including the floating logical link identifier to the determined reception port or the optical fiber $4_1, \ldots,$ or $4_n$.

Then, the routine of FIG. 13 is completed by step 1308.

In the above-described second embodiment, an EPON communication is carried out by using floating LLIDs which have no direct relationship to MAC addresses, and also, a processing can be carried out by referring to the subscriber numbers using the floating and fixed LLIDs without referring to its corresponding MAC address.

In FIG. 14, which illustrates a modification of the subscriber processing database file 32A and 32B of FIGS. 4 and 9, a multi-cast group identifier item is added thereto. Thus, at step 806 of FIG. 8 or step 1307 of FIG. 13, when the MPCP protocol section 35 transmits an MPCP protocol packet including the floating logical link identifiers belonging to the same multi-cast group identifier along with a flag showing a multi-cast packet to the determined reception ports, thus realizing a multi-cast communication.

Figure 15A:
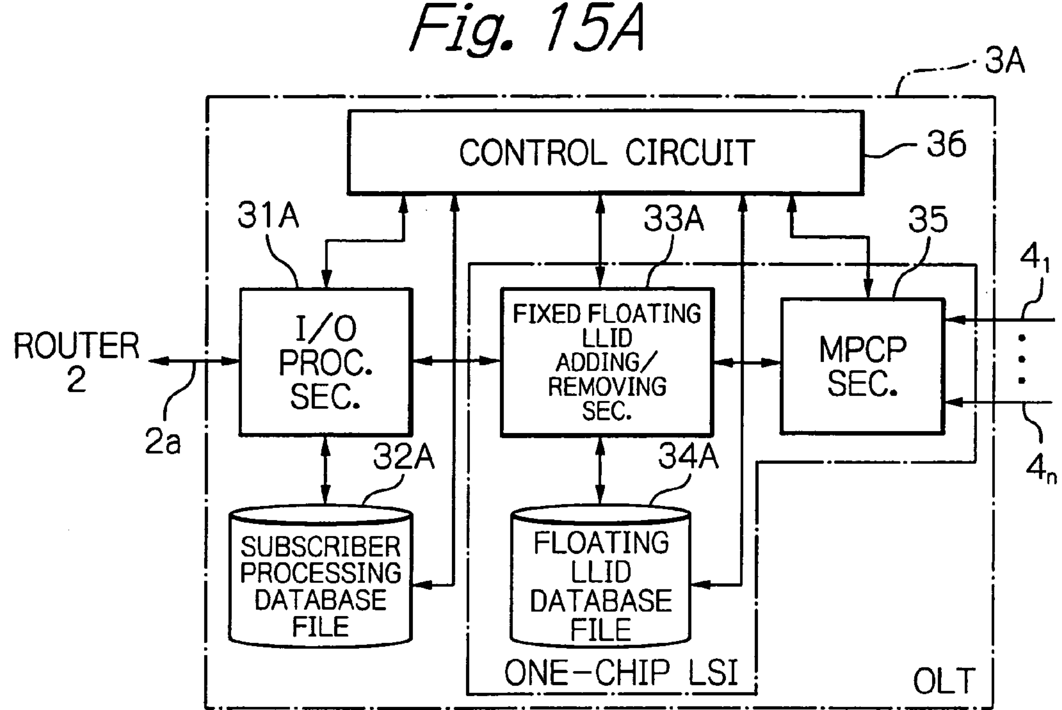
FIGS. 15A and 15B are first and second layout diagrams of the OLT of FIG. 4.

In FIG. 15A, which is a first layout diagram of the OLT 3A of FIG. 4, the floating logical link identifier adding/removing section 33A, the floating logical link identifier database file 34A and the MPCP section 35 are integrated into one chip, so that the addition/removal of floating logical identifiers can be carried out within this chip, although the size of the chip is increased.

Figure 15B:
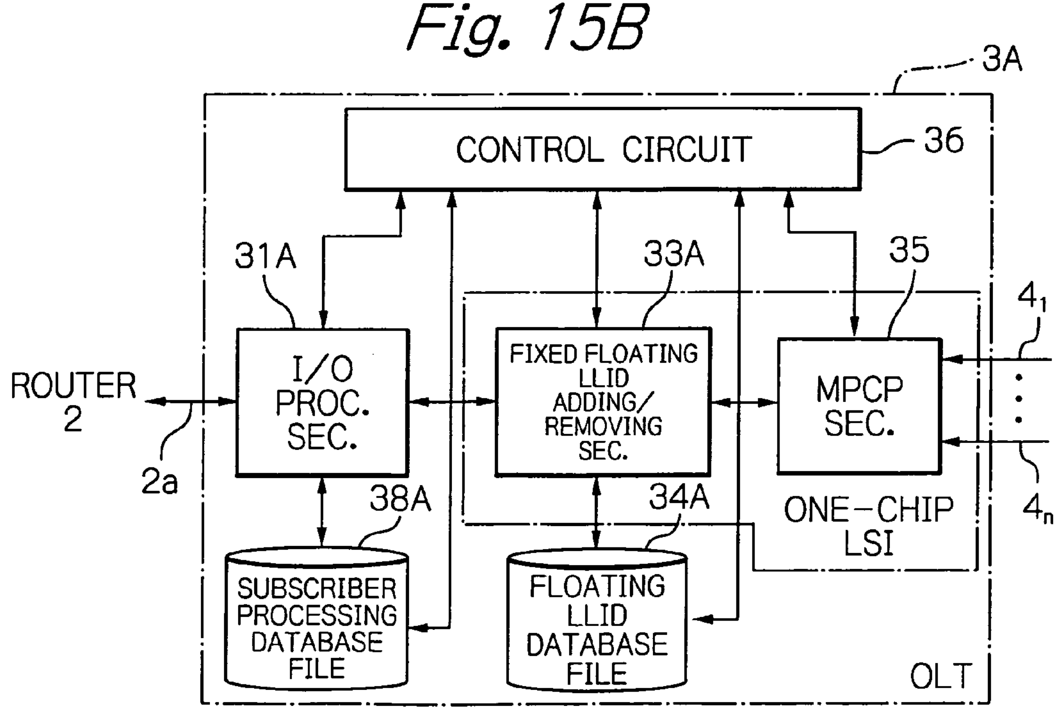

In FIG. 15B, which is a second layout diagram of the OLT 3A of FIG. 4, the floating logical link identifier adding/removing section 33A, and the MPCP section 35 are integrated into one chip, so that the transmission of packets in the downstream direction from the OLT 3A by adding floating LLIDs and the transmission of packets in the upstream direction to the OLT 3A by removing floating LLIDs can be simplified, although the supervision of floating LLIDs has to be carried out outside of the chip.

Figure 16A:
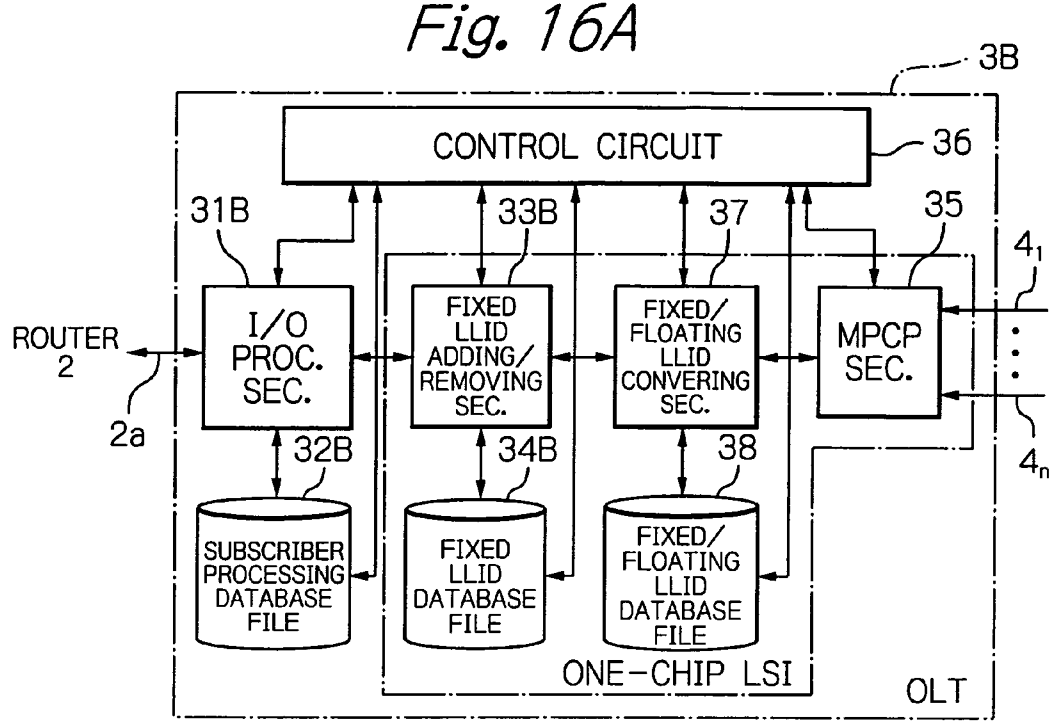
FIGS. 16A and 16B are first and second layout diagrams of the OLT of FIG. 9.

In FIG. 16A, which is a first layout diagram of the OLT 3B of FIG. 9, the fixed logical link identifier adding/removing section 33B, the fixed logical link identifier database file 34B, the fixed/floating logical link identifier converting section 37, the fixed/floating logical link identifier database file 38 and the MPCP section 35 are integrated into one chip, so that the addition/removal of floating logical identifiers can be carried out within this chip, although the size of the chip is increased.

Figure 16B:
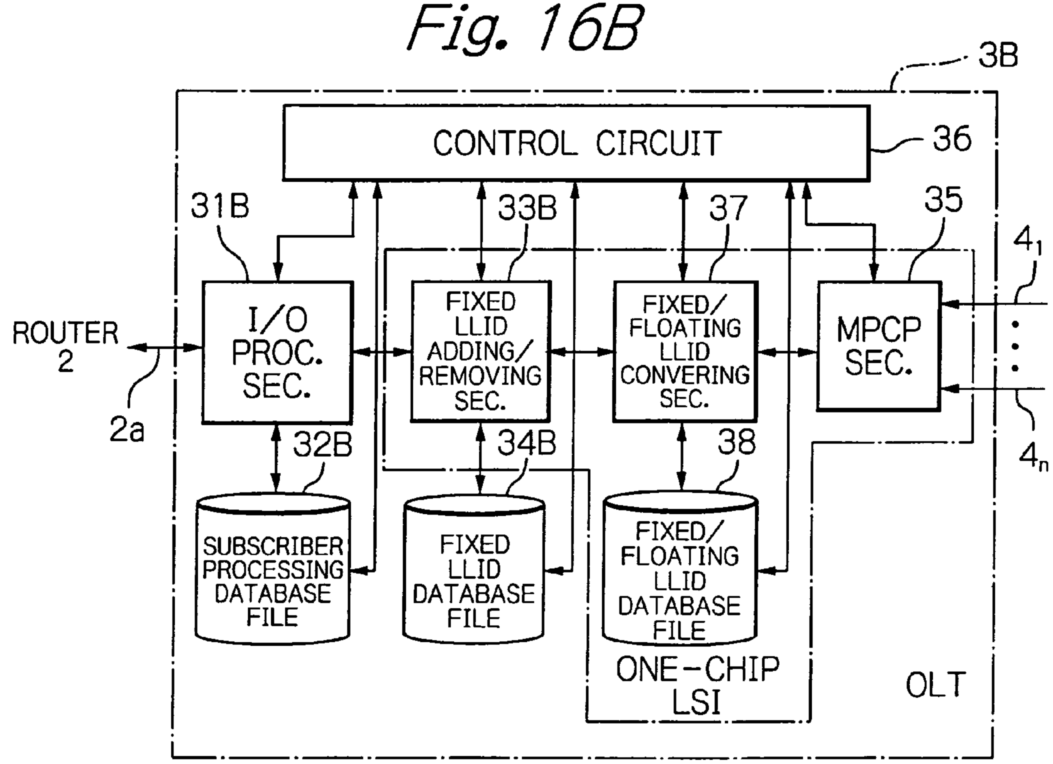

In FIG. 16B, which is a first layout diagram of the OLT 3B of FIG. 9, the fixed logical link identifier adding/removing section 33B, the fixed/floating logical link identifier converting section 37, the fixed/floating logical link identifier database file 38 and the MPCP section 35 are integrated into one chip, so that the transmission of packets in the downstream direction from the OLT 3B by adding fixed LLIDs and the transmission of packets in the upstream direction to the OLT 3A by removing fixed LLIDs can be simplified, although the supervision of fixed LLIDs has to be carried out outside of the chip.

The invention claimed is:

1. A center-side terminal of an optical network, said center-side terminal connectable to a plurality of subscriber-side terminals via a passive optical splitter, comprising:

a subscriber processing storing section adapted to store a relationship between subscriber numbers regarding said subscriber-side terminals and contents of the subscriber processing storing section allocated thereto;

a processing section adapted to perform a processing upon a packet received from said subscriber-side terminals or to be transmitted thereto, said processing being determined in accordance with the relationship stored in said subscriber processing storing section using one of said subscriber numbers regarding said packet; a fixed logical link identifier storing section adapted to store a relationship between said subscriber numbers and fixed logical link identifiers allocated thereto, said fixed logical link identifiers being fixed with respect to communication terminals connected to said subscribe-side terminals;

a fixed/floating logical link identifier storing section adapted to store a relationship between said fixed logical link identifiers and floating logical link identifiers allocated thereto, said floating logical identifiers being included in said packet when said packet is transmitted between said center-side terminal and said subscriber-side terminals;

a packet receiving section adapted to receive a packet from said subscriber-side terminals; and a floating logical link identifier-to-fixed logical link identifier converting section adapted to extract a floating logical link identifier of said received packet and convert said extracted floating logical link identifier to a fixed logical link identifier in accordance with the relationship stored in said fixed/floating logical link identifier storing section;

a fixed logical link identifier removing section adapted to read a subscriber number from the relationship stored in said fixed logical link identifier storing section using said converted fixed logical link identifier, and remove said converted fixed logical link from said received packet, said processing section determining a processing in accordance with the relationship stored in said subscriber processing storing section using said read subscriber number and performing said determined processing upon said received packet;

wherein the subscriber numbers are not a MAC address of the communication terminals connected to the subscriber-side terminals.

2. The center-side terminal as set forth in claim 1, said processing section determining a subscriber number of a transmission packet in accordance with a destination address of said transmission packet, reading a processing from the relationship stored in said processing storing section using said determined subscriber number, and performing said processing upon said transmission packet, said center-side terminal further comprising:

a fixed logical link adding section adapted to read a fixed logical link identifier in accordance with the relationship stored in said fixed logical link identifier storing section using said determined subscriber number and add said fixed logical link identifier to said transmission packet, a fixed logical link identifier-to-floating logical link identifier converting section adapted to convert said added fixed-logical link identifier to a floating logical link identifier in accordance with the relationship stored in said fixed/floating logical link identifier storing section; and a packet transmitting section adapted to transmit said transmission packet added by said converted floating logical link identifier to said subscriber-side terminals.

3. The center-side terminal as set forth in claim 2, wherein said subscriber processing storing section is further adapted to store a relationship between said subscriber numbers and multi-cast group identifiers allocated thereto, thus realizing a multi-cast communication.

4. A center-side terminal of an optical network, said center-side terminal connectable to a plurality of subscriber-side terminals via a passive optical splitter, comprising:

a subscriber processing database file adapted to store a relationship between subscriber numbers regarding said subscriber-side terminals and contents of the subscriber processing database file allocated thereto; and an input/output processing section adapted to perform a processing upon a packet received from said subscriber-side terminals or to be transmitted thereto, said processing being determined in accordance with the relationship stored in said subscriber processing database file using one of said subscriber numbers regarding said packet;

a fixed logical link identifier database file adapted to store a relationship between said subscriber numbers and fixed logical link identifiers allocated thereto, said fixed logical link identifiers being fixed with respect to communication terminals provided in connected to said subscriber-side terminals;

a fixed/floating logical link identifier database file adapted to store a relationship between said fixed logical link identifiers and floating logical link identifiers allocated thereto, said floating logical identifiers being included in said packet when said packet is transmitted between said center-side terminal and said subscriber-side terminals;

a packet receiving/transmitting section adapted to receive a packet from said subscriber-side terminals and transmit a packet to said subscriber-side terminals;

a fixed logical link identifier adding/removing section;

a fixed logical link identifier/floating logical link identifier converting section;

said fixed logical link identifier/logical link identifier converting section adapted to extract a floating logical link identifier of said received packet and convert said floating logical link identifier into a fixed logical link identifier in accordance with the relationship stored in said fixed/floating logical link identifier database file, said fixed logical link identifier adding/removing section being adapted to read a subscriber number from the relationship stored in said fixed logical link identifier database file using said converted fixed logical link identifier, and remove said converted fixed logical link from said received packet, said input/output processing section determining a processing in accordance with the relationship stored in said subscriber processing database file using said read subscriber number and performing said determined processing upon said received packet, said input/output processing section determining a subscriber number of a transmission packet in accordance with a destination address of said transmission packet, reading a processing from the relationship stored in said processing database file using said determined subscriber number, and performing said processing upon said transmission packet, said fixed logical link adding/removing section further being adapted to read a fixed logical link identifier in accordance with the relationship stored in said fixed logical link identifier database file using said determined subscriber number and add said fixed logical link identifier to said transmission packet, said fixed logical link identifier/floating logical link identifier converting section further being adapted to convert said added fixed logical link identifier to a floating logical link identifier in accordance with the relationship stored in said fixed/floating logical link identifier database file, said input/output processing section further being adapted to transmit said transmission packet added by said converted floating logical link identifier to said subscriber-side terminals;

wherein the subscriber numbers are not a MAC address of the communication terminals connected to the subscriber-side terminals.

5. The center-side terminal as set forth in claim 4, wherein said subscriber processing database file is further adapted to store a relationship between said subscriber numbers and multi-cast group identifiers allocated thereto, thus realizing a multi-cast communication.

6. The center-side terminal as set forth in claim 5, wherein said fixed logical link identifier adding/removing section, said fixed logical link identifier database file, said fixed/floating logical link identifier converting section, said fixed/floating logical link identifier database file and said packet receiving/transmitting section are integrated into one chip.

7. The center-side terminal as set forth in claim 5, wherein said fixed logical link identifier adding/removing section, said fixed/floating logical link identifier converting section, said fixed/floating logical link identifier database file and said packet receiving/transmitting section are integrated into one chip.

* * * * *